July 7, 1959          J. E. COLLINS          2,893,428

SOLENOID OPERATED PRESSURE BALANCED FLOW VALVE

Filed May 22, 1956

INVENTOR.
John E. Collins
BY
Bates, Teare + McBean
ATTORNEYS

United States Patent Office 2,893,428
Patented July 7, 1959

2,893,428

SOLENOID OPERATED PRESSURE BALANCED FLOW VALVE

John E. Collins, Akron, Ohio, assignor, by mesne assignments, to International Basic Economy Corporation, New York, N.Y., a corporation of New York Application May 22, 1956, Serial No. 586,484

4 Claims. (Cl. 137—620)

This invention relates to a pilot-operated control valve and more particularly relates to a balanced control valve of the pilot-operated type having an improved operation at relatively high operating pressures.

Various types of pilot-operated valves have been developed for controlling the flow in gaseous or liquid systems. One such type utilizes a solenoid actuated armature to position the valve spool. Conventional construction of such valves utilizes an unbalanced valve spool which does not adversely affect its operation when applied to a low pressure system. However, such an unbalanced condition is unsuitable for operation at relatively high operating pressures. Accordingly, it is a principal object of this invention to provide a balanced control valve which is positioned by a solenoid actuated armature to optimumly control the flow in gaseous or liquid systems at relatively high operating pressures.

The drawings show a valve embodying this invention. In the drawings.

Figure 1:
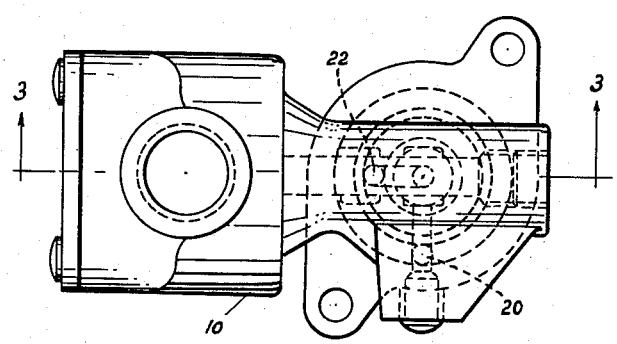
Fig. 1 is a plan view of the valve body enclosing the solenoid actuated plunger and valve spool.
Figure 2:
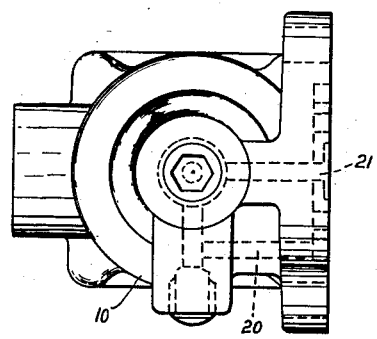
Fig. 2 is an end view of the valve housing.
Figure 3:
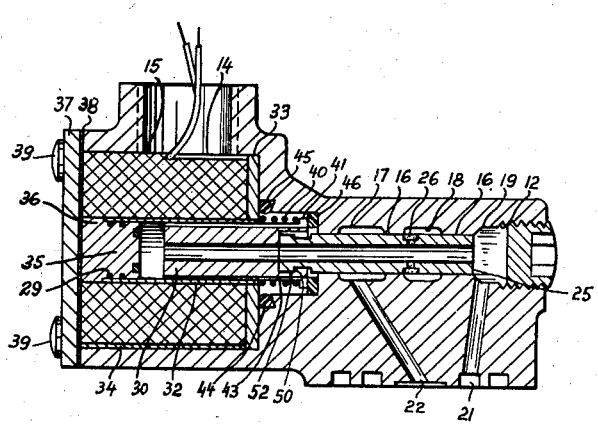
Fig. 3 is a sectional view of the valve body taken along the lines 3—3 in Fig. 1 of the drawings.

Referring now more particularly to Figs. 1 through 3 inclusive there is shown a valve body 10 having a valve chamber 12 extending inwardly from one end and communicating at its other end with a larger cavity 14 which encloses a solenoid coil 15. The valve chamber 12 is provided with a plurality of lands 16 which define axially separated, enlarged portions or ports 17, 18 and 19 of the valve chamber. Each enlarged portion of the valve chamber 12 has a passageway extending through the valve body for communication with other portions of the fluid system. Thus, the central port 18 communicates through an inlet passageway 20, best shown in dotted lines in Figs. 1 and 2, which is in turn coupled to a source of fluid under pressure when the valve body is assembled together with the other operative elements of the fluid system. Thus port 18 is the "pressure supply" port of the housing.

As best shown in Fig. 3 of the drawings, the port 19 of the valve chamber 12 has a transfer passageway 21 which is adapted to establish communication between the valve chamber and a working cylinder or the like and may thus be called the "fluid delivery" port. The port 17 of the valve chamber 12 has a passageway 22 which is adapted to establish communication with an exhaust and is herein called the "exhaust" port.

These passageways are selectively interconnected through the valve chamber 12 by means of a valve spool 25 which is seated for reciprocable movement within the valve chamber. The valve spool is tubular in form and has a port 26 extending through the tubular wall which establishes communication between the interior of the spool and the valve chamber. Thus, when the valve spool 25 is positioned to the right in Fig. 3 the spool port 26 establishes communication between the valve chamber port 18 and the transfer passageway 21 to supply operating fluid to a working cylinder. In the alternative, when the valve spool 25 is positioned to the left in Fig. 3, the spool port 26 establishes communication between the transfer passageway 21 and the exhaust port 17 of the valve chamber, thereby releasing the operating fluid from the working cylinder. In the latter case, the inlet portion 18 of the chamber is isolated from both the exhaust and transfer passageways.

The valve spool 25 is reciprocated within the valve chamber 12 by means of a solenoid actuated armature 30 which is adapted for axial movement in a continuation of the valve chamber formed by the annular coil 15. The armature 30 is made of magnetically susceptible material 15. The passageway through the coil is encircled by a sleeve 32 which is welded or otherwise suitably connected at its lower extremity to the end plate 33 seated against an internal shoulder formed between the enlarged coil supporting cavity and the valve chamber. A split cylindrical sleeve 34 coacts with the endplate 33 to provide a casing for the coil 15 which is otherwise completely sealed from the controlled fluid. The armature passageway is closed by a suitable plug 35 which is provided with an enlarged head 36 forming a shoulder that engages and abuts against the outer extremity of the internal sleeve 32. Suitable O-rings 29 are carried in grooves on the plug for sealing coaction with the walls of the sleeve 32 to provide a fluid tight closure for the extended valve chamber.

The entire coil assembly is secured within the large chamber 14 by means of an outer plate 37 and gasket 38, the gasket coacting in part as a shock plate and the assembly being secured tightly in the large chamber by tightening the outer screws 39. It is readily apparent from Fig. 3 of the drawings, that the armature and the valve spool 25 can readily be removed from the valve chamber 12 by simply removing the outer plate assembly and the plug 35.

Energization of the solenoid coil 15 will attract the armature 30 and cause it to move to the left when viewed in Fig. 3 of the drawings. A spring 40 encircles the armature 30 and coacts between the end plate 33 and a flange 41 at the inner extremity of the armature to bias the armature toward the delivery port 19. The adjacent extremities of the armature 30 and valve spool 25 are connected together in a manner to be hereinafter more fully described so that the position of the valve spool 25 is controlled by the position of the armature 30. Thus, in operation, the spring bias causes the valve spool 25 to be positioned to the right when viewed in Fig. 3 of the drawings in a normally opened position wherein the operating fluid passes to the working cylinder. Energization of the solenoid coil 15 will cause the interconnected armature 30 and the valve spool 25 to move to the left and thereby connect the working cylinder to the exhaust while isolating the valve chamber 12 from the source of operating fluid.

Balanced operation of the valve is accomplished by assuring that the operating fluid is at all times equalized at opposite ends and on all surfaces of the valve spool 25. Thus, the armature 30 is also tubular in form so that operating fluid also passes through the armature 30. Axially slotted external surfaces 43 and a loose connection between the adjacent extremities of the valve spool and armature assure that all exposed surfaces of the valve spool are subject to the same fluid pressure in a manner to provide a balanced condition; the only moving forces acting on the valve spool 25 being the spring bias in one direction and the magnetic attraction for the plunger 30 in the opposite direction. The intermediate portion of the internal cavity within the valve body 10 that supports the biasing spring 40 has an internal annular groove 44 adjacent the end plate 33 which carries an O-ring seal 45 and supports a gasket 46 at its inner extremity which acts as an internal seat for the armature 30.

Figure 4:
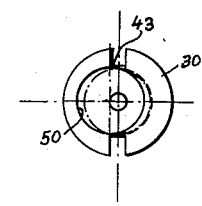
Fig. 4 is a view of the end of the armature which connects with the valve spool.

The connection between the armature 30 and the valve spool 25 is preferably accomplished by providing an open end recess 50 on the armature which is offset from the central axis. The side-wall of the recess 50 is undercut (dotted lines, Fig. 4) in the opposite direction to provide a reentrant recess which permits a flanged extremity 52 on the valve spool 25 to be received by the open end recess 50 and then shifted into interlocking relation with the reentrant recess until the armature and spool are in axial alignment (dotted lines, Fig. 4). The bearing surfaces between the valve spool 25 and the valve chamber 12 are lapped surfaces and the sleeve 32 defines an axially aligned and confined path of movement for the armature 30. Thus, once the armature and valve spool are assembled in axial alignment and disposed within the valve body, they will reciprocate together along a common axis. However, once the outer plate assembly 37, 38 is removed and the plug 35 is withdrawn, the armature 30 together with the valve spool 25 can be retracted from the valve body and separated by simply displacing them transversely relative to each other and withdrawing the valve spool 25 from the offset end recess 50. As previously noted, the interfitting coupling between the extremities of the armature and valve spool is a loose fitting connection, thereby assuring a balanced condition for the armature and valve spool within the chamber.

Thus, there has been provided a pilot-operated balanced control valve which operates in a highly satisfactory manner under high operating pressures to control flow in a gaseous or liquid system. The number of operating parts are reduced to a minimum and the assembly is so designed as to minimize difficulty in installation and maintenance. The valve may be operated at a relatively high frequency and is designed to give dependable service for a long period of time.

I have shown and described what I consider to be the preferred embodiment of my invention, and it will be obvious to those skilled in the art that other changes and modifications can be made without departing from the scope of my invention as defined by the appended claims.

I claim:
1. A pressure-balanced control valve comprising in combination, a valve body having a valve chamber with a plurality of internal annular lands defining axially separated ports, a tubular valve spool disposed for axial reciprocation in said valve chamber on said lands to control the flow through the ports and having opposing end faces of equal effective area, said valve spool having a port extending through its tubular wall intermediate its ends, one of said chamber ports being a fluid delivery port and being located at one end of the valve chamber, said spool having the entire area of one of its end faces in constant communication with said fluid delivery port at every axial position of said spool, and said delivery port being in constant communication through the tubular interior of the valve spool with the opposing end face of said spool remote from said delivery port, the other of said valve chamber ports being respectively a pressure supply port and an exhaust port and being located on opposite sides of the valve spool port for selective communication through the spool port and the tubular interior of the valve spool with said delivery port in different axial positions of the valve spool, means biasing said valve spool axially toward said delivery port, and means engaged axially with the end of said spool remote from said supply port and adapted for actuation to displace said spool axially against said biasing means.

2. A valve according to claim 1 wherein said last mentioned means is a tubular solenoid armature loosely connected to said end of said spool, said armature having opposing end faces of equal effective area intercommunicated by said tubular interior of the armature and with said tubular interior of the valve spool, said armature being engaged by said biasing means adjacent its junction with said spool, a stop in said valve housing against which said armature is biased, and an electromagnetic coil in said housing surrounding said armature and adapted when energized to displace said armature against said biasing means to shift the axial position of said valve spool relative to said ports.

3. A valve according to claim 2 wherein the connection between the adjoining ends of said armature and said valve spool members comprises an open end circular recess on the end of one of the members disposed eccentrically to the axis thereof and having a side wall portion undercut in a direction opposed to said eccentricity to define an axially re-entrant end recess portion, and a flange on the end of the other of said members adapted for reception in said recess and engageable with said reentrant portion of the recess to couple said members axially.

4. A valve according to claim 2 wherein said pressure supply port is located between said exhaust port and said delivery port so that the pressure supply port communicates with said delivery port when said coil is de-energized and so that said exhaust port communicates with said delivery port when the coil is energized.

References Cited in the file of this patent

UNITED STATES PATENTS

| | | |
|---|---|---|
| 1,465,723 | West | Aug. 21, 1923 |
| 2,675,828 | Booth | Apr. 20, 1954 |
| 2,675,831 | Jacques | Apr. 20, 1954 |

FOREIGN PATENTS

| | | |
|---|---|---|
| 477,091 | Canada | Sept. 18, 1951 |